Mar. 3, 1925.

R. F. BUTTS

SOLDERING TOOL

Filed Jan. 27, 1921

1,528,046

Attest:

Inventor:
Robert F. Butts
by Henry J. Lucke
his Atty.

Patented Mar. 3, 1925.

1,528,046

UNITED STATES PATENT OFFICE.

ROBERT F. BUTTS, OF MANSFIELD, PENNSYLVANIA.

SOLDERING TOOL.

Application filed January 27, 1921. Serial No. 440,256.

*To all whom it may concern:*

Be it known that I, ROBERT F. BUTTS, a citizen of the United States, residing at Mansfield, county of Tioga, State of Pennsylvania, have invented certain new and useful Improvements in Soldering Tools, of which the following is a specification.

My invention relates to soldering tools and has as one of its objects to provide simple and inexpensive, but efficient, means whereby soldering work may be carried on without interruption.

The invention is directed particularly for use with acetylene as the heating gas, although any other suitable gas or gases may be employed.

A further object of my invention is to provide a single soldering tool whereby practically all types of soldering work can be accomplished.

The novel features of my invention are pointed out with particularity in the appended claim. The most approved form of the invention, with further objects and advantages, will best be understood from the following description taken in connection with the accompanying drawings, in which—

Figure 1:
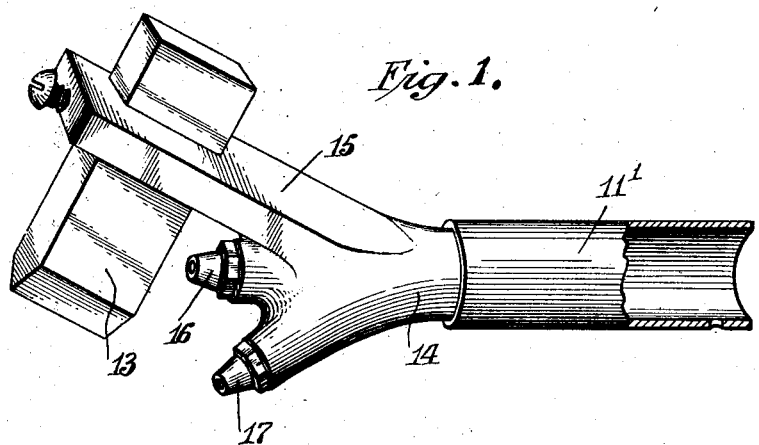
Figure 2:
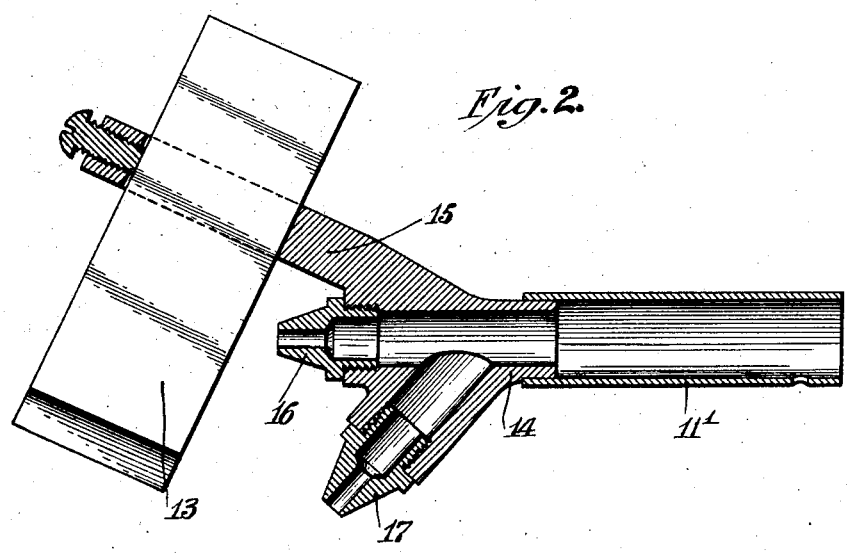

Figs. 1 and 2 are perspective and sectional views respectively of a form of head designed for heavy soldering, such as the seams of tanks, for roofing and the like, and embodying my invention.

The heat is supplied continuously by the flame and the head is not cooled off by the work, owing to the means of rapid conduction aforesaid, and this permits the use of fine and long tapered heads, so that work can be performed continuously and in difficultly accessible places where the ordinary type of copper or head would be useless due to its cooling too rapidly.

It will be seen that the sleeve such as 11 may be removed when desired from the handle 1 and a sleeve having a soldering head or copper therein best suited to the work in hand may then be attached to the handle.

Referring more particularly to Figs. 1 and 2, the sleeve 11 is provided with an extension 14 having a slightly offset arm 15 in which is releasably held the copper 13. The extension 14 has two burner tips thereon, 16 and 17 respectively, the tip 16 directs its flame against the copper 13 and the tip 17 directs its flame in advance of the copper to thereby preheat the work before the end of the copper is applied thereto.

It will be seen that by changing the sizes of the injector tip and the burner tip any desired temperature and size of flame may be maintained within wide limits, as may be demanded by the work being done.

The aforesaid various forms of soldering heads and tips and the injector means are constructed for the use of acetylene as the heating gas and it will be apparent that the novel features of my invention are also applicable for use with any other gas or gases in substitution of acetylene as the heat supply medium.

I claim.

A soldering tool comprising a copper and a plurality of burner tips, one of said tips delivering a heating flame against said copper and another of said tips delivering a preheating flame against the work in advance of said copper.

In testimony whereof I have signed this specification this thirteenth day of January, 1921.

ROBERT F. BUTTS.